United States Patent
Ryu et al.

(10) Patent No.: US 8,304,506 B2
(45) Date of Patent: Nov. 6, 2012

(54) POLYTHIOURETHANE-BASED POLYMERIZABLE COMPOSITION AND OPTICAL RESIN OBTAINED FROM THE SAME

(75) Inventors: Akinori Ryu, Arao (JP); Mamoru Tanaka, Omuta (JP); Kunio Okumura, Mobara (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 184 days.

(21) Appl. No.: 11/990,616

(22) PCT Filed: Aug. 4, 2006

(86) PCT No.: PCT/JP2006/315485
§ 371 (c)(1),
(2), (4) Date: Feb. 19, 2008

(87) PCT Pub. No.: WO2007/020817
PCT Pub. Date: Feb. 22, 2007

(65) Prior Publication Data
US 2009/0099329 A1    Apr. 16, 2009

(30) Foreign Application Priority Data

Aug. 18, 2005 (JP) ................ 2005-237382
Oct. 13, 2005 (JP) ................ 2005-298726
Nov. 25, 2005 (JP) ................ 2005-339720

(51) Int. Cl.
*C08G 18/00*        (2006.01)
(52) U.S. Cl. ............ 528/65; 528/67; 528/66; 528/373; 528/374; 528/375; 525/457; 525/458
(58) Field of Classification Search .............. 528/76, 528/373, 374, 65, 66, 67, 74, 375; 351/159, 351/49, 41; 525/457, 458
See application file for complete search history.

(56) References Cited

U.S. PATENT DOCUMENTS

| | | | |
|---|---|---|---|
| 5,059,673 A * | 10/1991 | Kanemura et al. | 528/67 |
| 5,087,758 A | 2/1992 | Kanemura et al. | |
| 5,326,501 A | 7/1994 | Ohkubo et al. | |
| 5,679,756 A * | 10/1997 | Zhu et al. | 528/65 |
| 5,942,158 A * | 8/1999 | Okoroafor et al. | 252/586 |
| 6,187,844 B1 * | 2/2001 | Murata | 524/91 |
| 6,777,494 B1 | 8/2004 | Yang et al. | |
| 7,098,290 B1 * | 8/2006 | Okoroafor et al. | 528/60 |
| 2006/0149018 A1 | 7/2006 | Kitahara | |
| 2007/0203318 A1 * | 8/2007 | Kuma et al. | 528/44 |

FOREIGN PATENT DOCUMENTS

| | | |
|---|---|---|
| CN | 1164540 A | 11/1997 |
| CN | 1175964 A | 3/1998 |
| EP | 1138670 A1 | 10/2001 |
| JP | 02-270859 A | 11/1990 |
| JP | 03-124722 A | 5/1991 |
| JP | 03-236386 A | 10/1991 |
| JP | 07-252207 A | 10/1995 |
| JP | 07-252341 A | 10/1995 |
| JP | 07-316250 A | 12/1995 |
| JP | 08208794 A * | 8/1996 |
| JP | 09-005679 A | 1/1997 |
| JP | 09-113852 A | 5/1997 |
| JP | 10-319201 A | 12/1998 |
| JP | 2002-226456 A | 8/2002 |
| KR | 1993-6918 B1 | 5/1991 |
| KR | 1998-7102151 A | 7/1998 |
| WO | WO 97/23529 A1 | 7/1997 |
| WO | WO 2004/108787 A1 | 12/2004 |
| WO | WO 2005087829 A1 * | 9/2005 |
| WO | WO 2007/020818 A1 | 2/2007 |

OTHER PUBLICATIONS

Office Action issued in Chinese Patent Application dated May 4, 2010.

* cited by examiner

*Primary Examiner* — Michael L Leonard
(74) *Attorney, Agent, or Firm* — Buchanan Ingersoll & Rooney PC

(57) ABSTRACT

Provided are a polymerizable composition for giving a resin which has a high refractive index and low dispersion, and is especially excellent in impact resistance and tintability; and a resin and an optical component each obtained by curing the composition. There used a polymerizable composition comprising (A) a compound represented by Formula (1) and/or by Formula (2), at least one compound as the following component (B), and at least one compound as the following component (C):

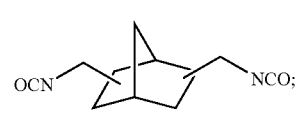

(1)

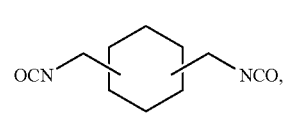

(2)

(B) polythiol compounds optionally having at least one (poly)sulfide bond in a molecule, and
(C) compounds represented by Formula (3):

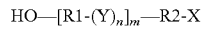

HO—[R1-(Y)$_n$]$_m$—R2-X    (3)

(in above Formula (3), X is an OH group or a SH group; Y is an oxygen atom or a sulfur atom; R1 and R2 are each independently an optionally substituted methylene group or an optionally substituted alkylene group having carbon atoms of not smaller than 2 and not larger than 4; n is an integer of 0 or 1 when Y is an oxygen atom, or 0 or an integer of not smaller than 1 and not larger than 2 when Y is a sulfur atom; and m is 0 or an integer of not smaller than 1 and not larger than 3, provided that (carbon number of R1+n)×m+(carbon number of R2) is 3 or larger).

10 Claims, No Drawings

POLYTHIOURETHANE-BASED POLYMERIZABLE COMPOSITION AND OPTICAL RESIN OBTAINED FROM THE SAME

TECHNICAL FIELD

The present invention relates to a polymerizable composition, a resin, and an optical component.

BACKGROUND ART

Since plastic lenses are lighter, less fragile, and tintable, as compared with inorganic lenses, in recent years, the application of plastic lenses to optical elements such as spectacles lenses, camera lenses or the like has increased rapidly.

In particular, spectacles lenses have been required to have various features including optical properties such as (1) high refractive index and (2) low dispersion property (high Abbe's number), and being (3) excellent in heat resistance, (4) excellent in impact resistance, (5) easily tintable, (6) excellent in working properties such as cutting properties and the like. Accordingly, various resin materials for lenses have been developed and used until now.

Representative examples of those can be mentioned by polythiourethane-based resins (Patent Documents 1 and 2).

Among the polythiourethane-based resins, a polythiourethane-based resin obtained by using an isocyanate compound represented by the following Formula (1) (Patent Document 3) is used to provide a plastic lens having a high refractive index and low dispersion property, and exhibiting excellent heat resistance and impact resistance, thus it has been widely used for spectacles lenses.

(1)

Moreover, recent spectacles lenses are often subjected to processing such as subjecting the substrate of lenses to silicon hard coat treatment or inorganic non-reflecting coat treatment, thereby increasing the added value. However, it has been known that the impact resistance of the lens is deteriorated by subjecting such coat treatments. Particularly in United States, there is a case where a polythiourethane-based resin lens excellent in impact resistance is also subjected to a primer coat for improving an impact resistance before being subjected to a hard coat treatment, so as to meet the standard for impact resistance defined by the U.S. Food and Drug Administration (FDA). In consequence, further improvement of the impact resistance on the substrate has been desired (Patent Document 4).

Further, fashionability in spectacles lenses has been required recently, thus the demand in colored lenses has increased.

Herein, the tintability and the heat resistance of a substrate are usually in a trade-off relationship, and the tintability deteriorates when the heat resistance is far too high. In addition, when the heat resistance is lowered to improve the tintability, a problem arise in that cracks form on a coat upon the application due to the difference in heat resistance between aforementioned hard coat or non-reflecting coat and the lens substrate.

Consequently, a resin for lens exhibiting heat resistance at around 100 to 110° C., which is adequate in practical, and having excellent tintability has been demanded.

Hereinabove, a plastic lens is mentioned as an example, however, there has been demanded a polythiourethane-based resin with improved balance between optical properties, tintability, and resin strength.

[Patent Document 1] Japanese Patent Laid-open No. 2-270859
[Patent Document 2] Japanese Patent Laid-open No. 7-252207
[Patent Document 3] Japanese Patent Laid-open No. 3-124722
[Patent Document 4] Japanese Patent Laid-open No. 9-113852

DISCLOSURE OF THE INVENTION

The present invention is made in the light of the above considerations, which provides a resin excellent in impact resistance, having enough heat resistance and improved tintability, than that of conventional resins, and a polymerizable composition for giving the same.

The present inventors have conducted extensive studies to solve the above problems, and as a result they have found that a polythiourethane-based resin obtained by reacting:

(A) at least one of alicyclic isocyanate compounds represented by following Formula (1) and/or by Formula (2); and
(B) at least one polythiol compound optionally having at least one (poly)sulfide bond in a molecule; with
(C) at least one of diol compounds or mercapto alcohol compounds represented by Formula (3), is a resin sufficiently satisfying the required properties. Thus, they have completed the invention.

That is, the invention includes:
[1] a polymerizable composition including,
(A) an alicyclic isocyanate compound represented by following Formula (1) and/or by following Formula (2):

(1)

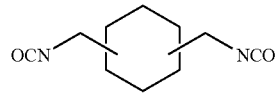

(2)

(B) at least one polythiol compound optionally having at least one (poly)sulfide bond in a molecule, and
(C) at least one compound represented by following Formula (3):

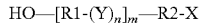

HO—[R1-(Y)$_n$]$_m$—R2-X    (3)

(in above Formula (3), X is an OH group or a SH group; Y is an oxygen atom or a sulfur atom; R1 and R2 are each independently an optionally substituted methylene group or an optionally substituted alkylene group having carbon atoms of not smaller than 2 and not larger than 4; n is an integer of 0 or 1 when Y is an oxygen atom, or 0 or an integer of not smaller than 1 and not larger than 2 when Y is a sulfur atom; and m is 0 or an integer of not smaller than 1 and not larger than 3, provided that (carbon number of R1+n)×m+(carbon number of R2) is 3 or larger);

[2] the polymerizable composition described in [1], wherein the used ratio of the (A) the alicyclic isocyanate compound represented by Formula (1) and/or by Formula (2), the (B) the polythiol compound optionally having at least one (poly) sulfide bond in a molecule, and the (C) the compound represented by Formula (3), is such that the molar ratio of functional groups represented by NCO/(SH+OH) is not less than 0.5 and not more than 3.0, and when given that the number of moles of the hydroxy group and thiol group in the (C) the compound represented by Formula (3) are p and q, respectively, and the number of mole of a thiol group in the (B) the polythiol compound optionally having at least one (poly)sulfide bond in a molecule is r, p/(p+q+r) is not less than 0.001 and not more than 0.40;

[3] the polymerizable composition described in [1], wherein the (B) the polythiol compound optionally having at least one (poly) sulfide bond in a molecule is at least one compound selected from the group consisting of 4-mercaptomethyl-1,8-dimercapto-3,6-dithiaoctane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane;

[4] the polymerizable composition described in [1], wherein in the Formula (3) representing the component (C), m is 0;

[5] the polymerizable composition described in [4], wherein the component (C) is 1,4-butanediol;

[6] the polymerizable composition described in [1], wherein in the Formula (3) representing the component (C), m is an integer of not smaller than 1 and not larger than 3;

[7] the polymerizable composition described in [6], wherein in the Formula (3) representing the component (C), n is 1 and Y is an oxygen atom;

[8] the polymerizable composition described in [7], wherein in the Formula (3) representing the component (C), R1 and R2 are each independently an optionally substituted alkylene group having 2 or 3 carbon atoms;

[9] the polymerizable composition described in [8], wherein the component (C) is triethylene glycol or diethylene glycol;

[10] the polymerizable composition as described in [5] or [9], wherein the (A) the alicyclic isocyanate compound represented by Formula (1) and/or by Formula (2) is the alicyclic isocyanate compound represented by the Formula (1), and the (B) the polythiol compound optionally having at least one (poly) sulfide bond in a molecule is at least one compound selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane;

[11] a process for producing a resin by polymerizing the polymerizable composition described in any one of [1] to [10];

[12] a resin obtained by reacting:
(A) an alicyclic isocyanate compound represented by following Formula (1) and/or by following Formula (2):

(1)

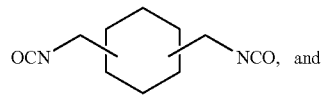

(2)

(B) at least one polythiol compound optionally having at least one (poly)sulfide bond in a molecule, with
(C) at least one compound represented by following Formula (3):

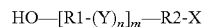

HO—[R1-(Y)$_n$]$_m$—R2-X     (3)

(in above Formula (3), X is an OH group or a SH group; Y is an oxygen atom or a sulfur atom; R1 and R2 are each independently an optionally substituted methylene group or an optionally substituted alkylene group having carbon atoms of not smaller than 2 and not larger than 4; n is an integer of 0 or 1 when Y is an oxygen atom, or 0 or an integer of not smaller than 1 and not larger than 2 when Y is a sulfur atom; and m is 0 or an integer of not smaller than 1 and not larger than 3, provided that (carbon number of R1+n)×m+(carbon number of R2) is 3 or larger);

[13] an optical component including the resin described in [12];

[14] a lens including the optical component described in [13];

[15] a spectacles lens including the lens described in [14];

[16] a use of the polymerizable composition described in any one of [1] to [10] as an optical component; and

[17] a use of the resin obtained by polymerizing the polymerizable composition described in any one of [1] to [10] as an optical component.

BEST MODE FOR CARRYING OUT THE INVENTION

The polymerizable composition of the invention includes the following components:

(A) an alicyclic isocyanate compound represented by following Formula (1) and/or by following Formula (2):

(1)

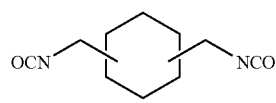

(2)

(B) at least one polythiol compound optionally having at least one (poly)sulfide bond in a molecule, and
(C) at least one compound represented by following Formula (3):

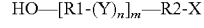

HO—[R1-(Y)$_n$]$_m$—R2-X     (3)

(in above Formula (3), X is an OH group or a SH group; Y is an oxygen atom or a sulfur atom; R1 and R2 are each independently an optionally substituted methylene group or an optionally substituted alkylene group having carbon atoms of not smaller than 2 and not larger than 4; n is an integer of 0 or 1 when Y is an oxygen atom, or 0 or an integer of not smaller than 1 and not larger than 2 when Y is a sulfur atom;

and m is 0 or an integer of not smaller than 1 and not larger than 3, provided that (carbon number of R1+n)×m+(carbon number of R2) is 3 or larger).

Herein, the polymerizable composition including components (A) to (C) indicates a polymerizable composition in which components (A) to (C) are blended. As long as each raw component is not all used up, some of the components may be used in the reaction.

In addition, the resin of the invention is obtained by reacting:

(A) an alicyclic isocyanate compound represented by following Formula (1) and/or by following Formula (2):

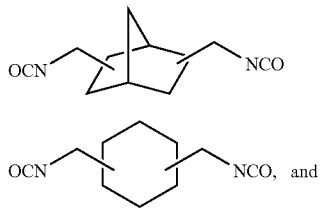

(1)

(2)

(B) at least one polythiol compound optionally having at least one (poly)sulfide bond in a molecule, with (C) at least one compound represented by following Formula (3)

(3)

(in above Formula (3), X is an OH group or a SH group; Y is an oxygen atom or a sulfur atom; R1 and R2 are each independently an optionally substituted methylene group or an optionally substituted alkylene group having carbon atoms of not smaller than 2 and not larger than 4; n is an integer of 0 or 1 when Y is an oxygen atom, or 0 or an integer of not smaller than 1 and not larger than 2 when Y is a sulfur atom; and m is 0 or an integer of not smaller than 1 and not larger than 3, provided that (carbon number of R1+n)×m+(carbon number of R2) is 3 or larger).

Since the resin includes components (A) to (C), excellent tintability and impact resistance are exhibited.

As the resin of the invention, specifically those obtained by polymerizing the aforementioned polymerizable composition of the invention can be exemplified.

Hereinafter, components will be explained with reference to specific examples, but the invention is not limited by those exemplified compounds mentioned below. For the invention, with respect to each component, exemplified compounds may be used alone or in combination of plural kinds.

First, (A) the alicyclic isocyanate compound represented by above Formula (1) and/or by above Formula (2) will be explained.

Examples of the alicyclic isocyanate compound represented by above Formula (1) include
2,5-bis(isocyanatomethyl)-bicyclo[2.2.1]heptane, 2,6-bis(isocyanatomethyl)-bicyclo[2.2.1]heptane, a mixture of 2,5-bis(isocyanatomethyl)-bicyclo[2.2.1]heptane and 2,6-bis(isocyanatomethyl)-bicyclo[2.2.1]heptane, and the like.

More specifically as the alicyclic isocyanate compound represented by above Formula (1),
2,5-(6)-bis(isocyanatomethyl)-bicyclo[2.2.1]heptane can be employed. Herein, 2,5(6)-bis(isocyanatomethyl)-bicyclo[2.2.1]heptane includes at least one of
2,5-bis(isocyanatomethyl)-bicyclo[2.2.1]heptane and 2,6-bis(isocyanatomethyl)-bicyclo[2.2.1]heptane, and which specifically may be any of following (i) to (iii):

(i) a single product of 2,5-bis(isocyanatomethyl)-bicyclo[2.2.1]heptane
(ii) a single product of 2,6-bis(isocyanatomethyl)-bicyclo[2.2.1]heptane
(iii) a mixture of 2,5-bis(isocyanatomethyl)-bicyclo[2.2.1]heptane and 2,6-bis(isocyanatomethyl)-bicyclo[2.2.1]heptane.

Examples of the alicyclic isocyanate compound represented by above Formula (2) include 1,4-bis(isocyanatomethyl)cyclohexane, 1,3-bis(isocyanatomethyl)cyclohexane, 1,2-bis(isocyanatomethyl)cyclohexane, and the like, and these may be used alone or in combination of two or more kinds.

The component (A) may be either the compound represented by above Formula (1) or the compound represented by above Formula (2), or may be a combination of these.

Next, the component (B) will be explained.

As (B) the polythiol compound optionally having at least one (poly)sulfide bond in a molecule, for example, following compounds can be mentioned:

an aliphatic polythiol compound such as methanedithiol, 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol or the like;

an aliphatic polythiol compound having (poly)sulfide bond(s) such as 4-mercaptomethyl-1,8-dimercapto-3,6-dithiaoctane, 4,8-dimercaptomethyl-1,11-dimercapto-3,6,9-trithiaundecane, 5,7-dimercaptomethyl-1,11-dimercapto-3,6,9-trithiaundecane, 4,7-dimercaptomethyl-1,11-dimercapto-3,6,9-trithiaundecane, tetrakis(mercaptomethyl)methane, 1,1,3,3-tetrakis(mercaptomethylthio)propane, 1,1,5,5-tetrakis(mercaptomethylthio)-3-thiapentane, 1,1,6,6-tetrakis(mercaptomethylthio)-3,4-dithiahexane, 2,2-bis(mercaptomethyl)-1,3-propanedithiol, bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptopropyl)disulfide, bis(mercaptomethylthio)methane, tris(mercaptomethylthio)methane, bis(mercaptoethylthio)methane, tris(mercaptoethylthio)methane, bis(mercaptopropylthio)methane, 1,2-bis(mercaptomethylthio)ethane, 1,2-bis(mercaptoethylthio)ethane, 1,3-bis(mercaptomethylthio)propane, 1,3-bis(mercaptoethylthio)propane, 1,3-bis(mercaptopropylthio)propane, 1,2,3-tris(mercaptomethylthio)propane, 1,2,3-tris(mercaptoethylthio)propane, 1,2,3-tris(mercaptopropylthio)propane, tetrakis(mercaptomethylthio)methane, tetrakis(mercaptoethylthiomethyl)methane, tetrakis(mercaptopropylthiomethyl)methane, 2,5-dimercapto-1,4-dithiane, 2,5-bismercaptomethyl-1,4-dithiane or the like;

an aliphatic polythiol compound having ester bond(s) such as ethyleneglycolbis(2-mercaptoacetate), ethyleneglycolbis(3-mercaptopropionate), diethyleneglycol(2-mercaptoacetate), diethyleneglycol(3-mercaptopropionate), 2,3-dimercapto-1-propanol(3-mercaptopropionate), 3-mercapto-1,2-propanediolbis(2-mercaptoacetate), 3-mercapto-1,2-propanediolbis(3-mercaptopropionate), trimethylolpropanetris(2-mercaptoacetate), trimethylolpropanetris(3-mercaptopropionate), trimethylolethanetris(2-mercaptoacetate), trimethylolethanetris(3-mercaptopropionate), pentaerythritoltetrakis(2-mercaptoacetate), pentaerythritoltetrakis(3-mercaptopropionate), glycerintris(2-mercaptoacetate), glycerintris(3-mercaptopropionate), 1,4-cyclohexanediolbis(2-mercaptoacetate), 1,4-cyclohexanediolbis(3-mercaptopropionate), hydroxymethylsulfide bis(2-mercaptoacetate), hydroxymethylsulfide bis(3-mercaptopropionate), hydroxyethylsulfide(2-mercaptoacetate), hydroxyethylsulfide(3-mercaptopropionate), hydroxymethyldisulfide(2-mercaptoacetate), hydroxymethyl disulfide(3-mercaptopropionate), (2-mercaptoethyl)thioglycolate, bis(mercaptoethyl)thiodipropionate or the like; and a compound having aromatic ring(s) such as 1,2-dimercaptobenzene, 1,3-dimercaptobenzene, 1,4-dimercaptobenzene, 1,2-bis(mercaptomethyl)benzene, 1,4-bis(mercaptomethyl)benzene, 1,2-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,3,5-tris(mercaptoethyl)benzene, 1,2,4-tris(mercaptoethyl)benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 2,2'-dimercaptobiphenyl, 4,4'-dimercaptobiphenyl or the like. Of these, one kind alone or two or more kinds can be used.

Among these, (B) the polythiol compound optionally having at least one (poly)sulfide bond in a molecule is more preferably a constitution including at least one of 4-mercaptomethyl-1,8-dimercapto-3,6-dithiaoctane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

Next, the component (C) will be explained.

Among (C) the compounds represented by above Formula (3), a compound in which X is an SH group can be mentioned by followings.

For example, as the compound in which m=0, 3-mercaptopropanol, 4-mercaptobutanol, and the like can be exemplified.

As the compound in which m=1 and n=0, 5-mercaptopentanol, 6-mercaptohexanol, 7-mercaptoheptanol, 8-mercaptooctanol, and the like can be exemplified.

Further, as the compound in which m=1, Y=S, and n=1, 5-mercapto-3-thiapentanol and the like can be exemplified. However, the invention is not limited by those exemplified compounds.

Among (C) the compounds represented by above Formula (3), a compound in which X is an OH group can be mentioned by followings.

As the compound in which m=0, for example, following alkanediols can be mentioned:
1,3-propanediol, 1,4-butanediol, and 1,3-butanediol.

Among these, 1,4-butanediol can be preferably employed.

As the compound in which m is an integer of 1 or more and 3 or less, following compounds can be exemplified.

First, as the compound in which m=1 and n=0, following compounds can be mentioned:
1,5-pentanediol, 1,4-pentanediol, 1,3-pentanediol, 1,6-hexanediol, 1,5-hexanediol, 1,4-hexanediol, 1,3-hexanediol, 1,7-heptanediol, and 1,8-octanediol.

As the compound in which n=1 and Y=O, that is, the compound having ether bond(s) in a molecular structure, for example, following compounds can be mentioned.

As the compound in which m=1, n=1, and Y=O, dialkylene glycols such as diethylene glycol and dipropylene glycol can be exemplified.

As the compound in which m=2, n=1, and Y=O, trialkylene glycols such as triethylene glycol and tripropylene glycol can be exemplified.

Since X is an OH group in the above exemplified compounds, both X and Y are oxygen atoms. In the above exemplified compounds, R1 and R2 are each independently an optionally substituted alkylene group having 2 or 3 carbon atoms. Among these, triethylene glycol and diethylene glycol can be preferably employed.

As the compound in which n=1 or 2 and Y=S, that is, the compound having sulfide bond(s) in a molecular structure, for example, following compounds can be mentioned.

As the compound in which m=1, n=1, and Y=S, thiodialkanols such as thiodiethanol and thiodipropanol can be exemplified.

As the compound in which m=1, n=2, and Y=S, dithiodialkanols such as dithiodiethanol and dithiodipropanol can be exemplified.

In the above exemplified compounds, R1 and R2 are each independently an optionally substituted alkylene group having 2 or 3 carbon atoms.

Among the compounds in which m is an integer of 1 or more and 3 or less, compounds in which m is a integer of 1 or more and 3 or less, n is 1, and Y is an oxygen atom, that is compounds having ether bond(s) in a molecular structure are preferable. By employing such compounds as the compound represented by above Formula (3), the generation of heat or sudden increase in viscosity can be controlled upon mixing the components during the production of a resin. Accordingly, stability in producing a resin can be improved.

Among the aforementioned compounds in which X is an OH group, diethylene glycol, triethylene glycol, and 1,4-butanediol are particularly preferable.

Herein, the invention is not limited by those exemplified compounds, and these may be used alone, respectively, or as a mixture of two or more kinds.

The used ratio of (A) the alicyclic isocyanate compound represented by above Formula (1) and/or by above Formula (2), (B) the polythiol compound optionally having at least one (poly) sulfide bond in a molecule, and the (C) the compound represented by Formula (3), is such that the molar ratio of functional groups represented by NCO/(SH+OH) is usually not less than 0.5 and not more than 3.0, preferably not less than 0.5 and not more than 1.5, and particularly preferably not less than 0.8 and not more than 1.2. Within this range, a resin with well-balanced refractive index, impact resistance, tintability, and heat resistance can be obtained.

Here, there is a concern that the curing property of the polymerizable composition deteriorates when the value of NCO/(SH+OH) is too small. The curing property of the polymerizable composition can be further improved by making NCO/(SH+OH) to be 0.5 or larger, preferably 0.8 or larger. In this manner, mechanical properties such as resin strength, impact resistance of the resin or the like can be further improved.

In addition, there is a concern that the refractive index of the resin lowers when the value of NCO/(SH+OH) is too large because the refractive index increases as the amount of SH groups in the resin increases. The refractive index of the resin can be increased by making NCO/(SH+OH) to be 3.0 or smaller, preferably 1.5 or smaller, and more preferably 1.2 or smaller. In this manner, the resin can be further preferably employed to, for example, an optical component.

Further, when given that the number of moles of the hydroxy group and thiol group in the (C) the compound represented by Formula (3) are p and q, respectively, and the number of moles of a thiol group in the (B) the polythiol compound optionally having at least one (poly) sulfide bond in a molecule is r, p/(p+q+r) is usually not less than 0.001 and not more than 0.40, preferably not less than 0.03 and not more than 0.35, and particularly preferably not less than 0.05 and not more than 0.30. Also in this manner, a resin with well-balanced refractive index, impact resistance, tintability, and heat resistance can be obtained.

Here, there is a concern that the impact resistance of the resin deteriorates when the value of p/(p+q+r) is too small because the impact resistance improves as the amount of OH groups in the resin increases. The impact resistance of the resin can be improved by making p/(p+q+r) to be 0.001 or larger, preferably 0.03 or larger, and more preferably 0.05 or larger.

Meanwhile, there is a concern that the refractive index of the resin lowers when the amount of OH groups is too large with respect to that of SH groups. Lowering of the refractive index of the resin can also be controlled by making p/(p+q+r) to be 0.40 or smaller, preferably 0.35 or smaller, and more preferably 0.30 or smaller.

The balance between the mechanical properties and refractive index can be further improved by making the molar ratio of the functional groups represented by NCO/(SH+OH) to be in the above range and also by making p/(p+q+r) to be in the above range.

For the polymerizable composition of the invention, specifically,
(A) the alicyclic isocyanate compound represented by above Formula (1) and/or by above Formula (2) is the alicyclic isocyanate compound represented by above Formula (1), and (B) the polythiol compound optionally having at least one (poly) sulfide bond in a molecule is at least one compound selected from the group consisting of
4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

For the polymerizable composition of the invention, more specifically,
when the alicyclic isocyanate compound represented by above Formula (1) as (A) the alicyclic isocyanate compound represented by above Formula (1) and/or by above Formula (2); at least one compound selected from the group consisting of
4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, as (B) the polythiol compound optionally having at least one (poly)sulfide bond in a molecule; and diethylene glycol or triethylene glycol as (C) the compound represented by above Formula (3), are used in combination for polymerization to give a resin, a resin having further excellent impact resistance and tintability can be obtained, and at the same time it results in giving sufficiently satisfied refractive index, Abbe's number, and heat resistance.

In addition, for the polymerizable composition of the invention, small amount of active hydrogen compound other than those mentioned above may be used for the purpose of modifying the resin such as improving heat resistance or the like. The active hydrogen compound which can be used herein is a compound having active hydrogen which reacts with isocyanate such as polyol (compound having two or more hydroxyl groups on the molecular terminal), thiol, or amine compounds, and examples thereof include 2-mercaptoethanol, thioglycerin, glycerol, benzenethiol, benzenedithiol, ethylene glycol, 1,4-dithioerythritol, 1,4-dithiothreitol, and the like. These may be used alone, respectively, or as a mixture of two or more kinds.

Next, processes for producing the resin of the invention will be explained.

The resin of the invention can be obtained by the reaction between the above-mentioned components (A) to (C). The order of mixing the components is not particularly limited, but for example, there may be employed:
(i) a process which includes first reacting the component (A) with the component (C) and then adding the component (B) thereto to carry out a polymerization; or
(ii) a process which includes mixing the components (A), (B), and (C) at once to carry out a polymerization.

Herein, for the polymerization process, for example, a process which includes curing by heating can be employed.

When the component (C) is a compound having neither of an ether bond or a thioether bond in the molecular structure, it is preferable to employ the above-mentioned process (i). In this manner, sudden heat generation or viscosity increase can be further controlled upon mixing the components.

A resin obtained by the process (i) or (ii), as a result, exhibits excellent impact resistance and tintability and gives sufficiently satisfied refractive index, Abbe's number, and heat resistance.

In addition, the resin of the invention can be obtained by polymerizing the polymerizable composition of the invention.

In specific, the polythiourethane-based resin of the invention can be produced by blending a polymerizable composition which includes:
(A) the alicyclic isocyanate compound represented by above Formula (1) and/or by above Formula (2);
(B) at least one polythiol compound optionally having at least one (poly)sulfide bond in a molecule; and
(C) at least one compound represented by Formula (3), and then carrying out a polymerization. The polymerizable composition of the invention is cured by the polymerization. In specific, the resin can be obtained by curing the polymerizable composition of the invention by heating in the presence of a catalyst.

The polythiourethane-based resin obtained in accordance with the production process of the invention exhibits a high refractive index and low dispersion property, and in particular, excellent impact resistance and tintability, and sufficient heat resistance.

When curing the polymerizable composition of the invention by polymerization, as in a known molding process, a variety of additives may be added, if necessary, which are, for example, a chain extender, a crosslinking agent, a light stabilizer, an ultraviolet absorber, an antioxidant, a coloring inhibitor, a bluing agent, and so on. The heating process is not particularly limited, and for example, a process of curing by heating or the like can be employed.

For the purpose of adjusting a reaction rate to a desired level, it is also possible to add a suitable amount of a known reaction catalyst. As the preferred catalyst employed as a catalyst for the preparation of urethane, there may be employed, for example, a tin compound such as dibutyltin dilaurate, dibutyltin dichloride, dimethyltin dichloride, tetramethyl diacetoxy distannoxane, tetraethyl diacetoxy distannoxane, or tetrapropyl diacetoxy distannoxane, or an amine compound such as tertiary amine. These may be used alone or in combination of two or more kinds. The amount of catalyst added is preferably not less than 0.001 wt % and not more than 1 wt % with respect to the total weight amount of composition monomers. Within this range, more favored polymerizability is exhibited, and it is preferred to be within such range from the viewpoints of pot life upon blending, and transparency, optical properties, and light resistance, of the resin to be obtained.

In regard to the order of adding the catalyst and the mold release agent to be used, for example, there may be employed a method of preliminarily dissolving in an isocyanate compound, a polythiol compound, a diol compound, and/or a mercapto alcohol compound, a method of adding to a mixture of an isocyanate compound and a diol compound, and/or mercapto alcohol, and a polythiol compound, or the like, but not limited by those exemplified methods and they may be added at any timing as long as the handling nature, safety, adequacy, and the like, are taken into account. For the form of the catalyst, mold release agent, and other additives, upon addition, they may be directly added as it is, or may be prepared into a master liquid by being dissolved in some of monomers used so as to be then added.

The resin of the invention can be obtained by a usual casting polymerization. To be specific, a mixed solution is preliminarily prepared by mixing various additives such as a catalyst, a UV absorber, and an internal mold release agent into monomers to be used. The mixed solution is degasified by a suitable method, if necessary, and then injected into a mold composed of 2 pieces of glass plates and tape or gasket to subject polymerization. The viscosity for the injection is not particularly limited, but the viscosity of the monomer mixed solution is preferably 20 mPa·s or larger and 1,000 mPa·s or smaller. The polymerization conditions upon polymerization are not particularly limited as the conditions significantly differ in accordance with types of monomers and catalyst to be used, an amount of those added, a form of mold type, and the like. However, in the case of a thermal polymerization, the polymerization is carried out at a temperature equal to or higher than −20° C. and equal to or lower than 200° C. over 1 hour or longer and 100 hours or shorter.

The polythiourethane-based resin of the invention mainly includes a urethane bond resulted from an isocyanate group and a hydroxy group, and a thiourethane bond resulted from an isocyanate group and a thiol group, but it may not be a problem to include any other than those such as an S-alkyl thiocarbamic acid ester bond, an allophanate bond, a urea bond, or a biuret bond, in some purposes. For example, there are many cases where further subjecting a urethane bond or an S-alkyl thiocarbamic acid ester bond to a reaction with an isocyanate group to increase the cross-linkage density gives a favorable result. In this case, the reaction temperature is increased up to at least 100° C. and the isocyanate component is a lot used. Alternatively, some of amines or the like may be employed in combination, thereby allowing the employ of a urea bond or a biuret bond. In such a case of employing compounds other than polyol compounds or polythiol compounds that can react with an isocyanate compound, it is necessary to pay attention particularly to coloring.

According to the invention, it is understood that the polythiourethane-based resin obtained by polymerizing a polymerization composition which includes (A) the alicyclic isocyanate compound represented by above Formula (1) and/or by above Formula (2); (B) at least one polythiol compound optionally having at least one (poly) sulfide bond in a molecule; and (C) at least one compound represented by above Formula (3), and the resin obtained by the reaction between the above-mentioned components (A) to (C), exhibit more excellent impact resistance and tintability, and satisfied properties in all of refractive index, Abbe's number, and heat resistance, than those of conventional resins.

Accordingly, since the polythiourethane-based resin of the invention is colorless and transparent, and has excellent optical properties, the resin is ideal for use as an optical component or an optical element material such as lenses, for example, spectacles lenses and the like, prism, camera lens, optical fiber, information recording plate, filter, light-emitting diode and the like.

In specific, according to the invention, a composition for giving a resin for lenses and the resin which is more excellent in impact resistance and tintability, than resins for lenses in the past, as well as satisfying all of refractive index, Abbe's number, and heat resistance; can be obtained.

In addition, according to the invention, a transparent cured resin excellent in impact resistance and tintability can be obtained for an optical material in the field where a high refractive index material is employed, and in particular, a material ideally used in the field of optical component including lenses such as spectacles lenses can be obtained. The polythiourethane-based lens of the invention has high refractive index and low dispersion property, is excellent in heat resistance and tintability, and further characterized in that of which the resin strength and the impact resistance are excellent, thus the lens is suitable for use as an optical component such as spectacles lenses, camera lenses and the like.

The polythiourethane-based lens of the invention may have a coating layer on one side or both sides thereof, if necessary. As the coating layer, a primer layer, a hard coat layer, an antireflection film, an antifogging coat film, an antistaining layer, a water-repellent layer, or the like, can be exemplified. These coating layers may be used alone, respectively, or a plurality of coating layers may be formed into a multi-layer to be used. In the case of providing coating layers on both sides, the coating layers provided on each side may either be the same with or different from each other. For those coating layers, there may be employed in combination an UV absorber for the purpose of protecting lenses or eyes from UV light, an IR absorber for the purpose of protecting eyes from infrared rays, a light stabilizer or antioxidant for the purpose of improving the weatherability of lenses, dye or pigment for the purpose of increasing fashionability of lenses, photochromic dye or photochromic pigment, an antistatic agent, and other known additives for improving the properties of lenses, respectively. Various leveling agents for improving the coatability may also be used for the layer which to be coated by application.

The primer layer is a coating layer provided for the purpose of improving the adhesiveness between the hard coat layer and lenses, and there may be a case where the impact resistance is also improved. For the primer layer, any material can be used as long as it provides high adhesivity to the obtained optical lens, and usually employed are a urethane-based resin, an epoxy-based resin, a polyester-based resin, a melamine-based resin, a primer composition mainly including polyvinylacetal, and the like.

The hard coat layer is a coating layer provided for the purpose of giving functions such as an anti-scratching property, abrasion resistance, humidity resistance, hot-water resistance, heat resistance, and weather resistance, to the lens surface. For the hard coat layer, a hard coat composition including an organosilicon compound having curing property and at least one particulate oxide of element selected from the group consisting of Si, Al, Sn, Sb, Ta, Ce, La, Fe, Zn, W, Zr, In, and Ti and/or at least one particulate constituted of a composite oxide of two or more elements selected from the group consisting of those elements, are generally used.

The antireflection layer is usually formed on the above hard coat layer, if necessary. There are an inorganic type and an organic type for the antireflection layer, and the inorganic type is provided by the use of inorganic oxide such as $SiO_2$ and $TiO_2$ in accordance with the dry method such as a vacuum evaporation technique, a sputtering method, an ion plating method, an ion beam assist method, a CVD method or the like. The organic type is provided by the use of a composition which includes an organosilicon compound and a silica particle having internal cavity, in accordance with the wet method.

If necessary, an antifogging coat film, an anti-staining layer, and a water-repellent layer may be further formed on the antireflection layer. As the means for forming the antifogging coat film, the anti-staining layer, and the water-repellent layer, methods and materials for the treatment thereof, or the like are not particularly limited as long as it is within the scope of not adversely affecting the antireflection properties, and there may be employed a generally known antifogging coat treatment method, anti-staining treatment method, water-repellent treatment method, and materials.

In addition, the obtained polythiourethane-based lens may be tinted for a use with a dye appropriate for the purpose so as to provide a fashionability or a photochromic property. Tinting of lens can be carried out in accordance with a generally known tinting method, and is carried out generally by the following methods: (1) a method of immersing a lens in a tinting liquid, (2) a method of subjecting coating with the use of a coating agent containing a dye, or providing a tintable coating layer and tinting the provided coating layer, (3) a method of polymerizing monomer raw materials in which tintable materials are contained, (4) a method of heating a sublimation dye to allow sublimation, and the like.

The method (1) is a method including immersing a lens material finished on a predetermined optical surface in a tinting liquid in which the dye to be used is dissolved or uniformly dispersed (tinting process), and solidifying the dye by heating the lens (annealing process after tinting), if necessary. There are no particular limitations on the dye used in the tinting process as long as a generally known dye us used, but an oil-soluble dye or a disperse dye is usually used. The solvent used in the tinting process is not particularly limited as long as it is the solvent in which the dye to be used can be dissolved or uniformly dispersed therein. In the tinting process, a surfactant for dispersing the dye in a tinting liquid or a carrier which encourages tinting may also be employed, if necessary.

The method (2) is not for directly tinting a plastic lens material, and it is the method either including a process of coating a plastic lens with an organic coating liquid in which a dye is dispersed or dissolved and subjecting to a curing treatment to form a tinted coating layer on a lens surface, or a process of forming a tintable coating layer on a plastic lens surface, immersing the plastic lens in a tinting liquid, and subjecting to heating to be tinted. The method (2) is a method including a process of immersing a plastic lens in a tinting liquid and subjecting to heating to be tinted.

The method (3) is a method including preliminarily dissolving a dye in monomer raw materials for a plastic lens and thereafter carrying out a polymerization. The dye to be used is not particularly limited as long as it can be uniformly dissolved or dispersed to the extent of not deteriorating the optical properties, in monomer raw materials.

As the method (4), there may be employed:
(i) a method which includes sublimating a solid sublimation dye and tinting a plastic lens;
(ii) a method which includes facing a plastic lens to a substrate to which a solution containing a sublimation dye is applied in a non-contacting manner, and heating the substrate and the lens to allow tinting; or
(iii) a method which includes transferring a transfer layer composed of a colored layer containing a sublimation dye and an adhesive layer to a plastic lens, and thereafter heating to allow tinting. Optical lenses of the invention may be tinted in accordance with any of those methods. The dye to be used is not particularly limited as long as it is a dye having a sublimating property.

EXAMPLES

Hereinafter, the invention will be explained in more detail with reference to Examples.

In Examples below, resins were prepared and following evaluations were carried out to assess their adequacy as the optical component. Properties (refractive index, heat resistance, resin strength, tintability, and impact resistance) of the obtained resins were tested in accordance with the following test methods.

Refractive Index ($n_e$), Abbe's Number ($v_e$): Refractive index and Abbe's number were respectively measured with the use of Pulfrich refractometer at 20° C.

Heat Resistance: Tg (° C.) by TMA penetration method (50 g load, pin tip of 0.5 mmφ, rate of temperature increase of 10° C./min) was determined as the heat resistance.

Resin Strength Resin strength was evaluated in accordance with the maximum point in tensile stress. A polythiourethane-based resin was prepared into a dumbbell test piece of 3 mm in thickness, 85 mm in length and 5 mm in width with the use of AUTOGRAPH AGS-J manufactured by Shimadzu Corporation, and a maximum load ($N/mm^2$) while applying load to the test piece at a stress rate between 1 mm/min (distortion up to 0.35%) and 5 mm/min at a temperature of 20° C. was calculated.

Tintability: To 995 g of pure water, 1.5 g of "MLP-Blue", 2.0 g of "MLP-Yellow", and 1.5 g of "MLP-Red", which are dispersion dyes for spectacles lenses produced by Miike Senryou Corporation, were added as the coloring agents to prepare a dye-dispersed solution. The solution was heated to 90° C., and then a polythiourethane-based resin piece having a thickness of 9 mm was immersed therein for 5 minutes at 90° C. to be tinted. The tinted resin piece was scanned from the wavelength of 400 nm to 800 nm, and the transmission ratio (% T) at a wavelength of 565 nm was measured by UV spectrometer (UV-1600 manufactured by Shimadzu Corporation). Those with transmission ratio of 40% or less were rated as ○ (good), greater than 40% and less than 60% were rated as Δ (equivalent), and 60% or greater were rated as X (bad).

Impact Resistance: 50% nondestructive weight was determined by dropping balls of light weighed to heavy weighed in order onto a lens having a center thickness of 1.0 mm, from a height of 127 cm in accordance with the FDA test method. Those with 50% nondestructive weight of 1,000 g or greater were rated as ○ (good), greater than 300 g or less than 1,000 g were rated as Δ (equivalent), and 300 g or less were rated as X (bad).

Formulations for each Example are shown in Table 1, and evaluation results are shown in Table 2.

Example 1

To 57.38 g of 2,5(6)-bis(isocyanatomethyl)-bicyclo[2.2.1] heptane, 0.10 g of dibutyltin chloride as the curing catalyst, 0.25 g of internal mold release agent (product name: Zelec UN), and 0.05 g of UV absorbing agent (product name: Viosorb 583) were mixed and dissolved at 20° C., to give a homogeneous solution. To this homogeneous solution, 7.52 g of 1,4-butanediol was added, and the mixed solution was stirred for 20 minutes at 30° C., then cooled down to 20° C., and further stirred for 30 minutes. Thereafter, 35.10 g of 4-mercaptomethyl-1,8-dimercapto-3,6-dithiaoctane was added thereto to be mixed and dissolved therein.

After degasifying the homogenous solution at 600 Pa for 1 hour, the resultant was filtered through a 1 µm PTFE made filter, and then charged into a mold assembled from a pair of glass molds and tape. The mold was placed in an oven and slowly heated from a temperature of 25° C. to 120° C. over 20 hours, and the polymerization was carried out. After completing the polymerization, the mold was taken out from the oven, and mold-released to obtain a resin. The obtained resin was further subjected to annealing at 120° C. for 4 hours.

The resin thus obtained was colorless and had high transparency, thereby being preferable. The resin had a refractive index (ne) of 1.597, Abbe's number (ve) of 41, heat resistance at 109° C., maximum point in tensile stress test of 95 (N/mm$^2$), tintability of 37% transmission ratio, and impact resistance of 1,000 g or greater in 50% nondestructive weight. The evaluation results are shown in Table 2.

Example 2

To 54.22 g of 2,5(6)-bis(isocyanatomethyl)-bicyclo[2.2.1]heptane, 0.10 g of dibutyltin chloride as the curing catalyst, 0.25 g of internal mold release agent (product name: Zelec UN), and 0.05 g of UV absorbing agent (product name: Viosorb 583) were mixed and dissolved at 20° C., to give a homogeneous solution. To this homogeneous solution, 7.89 g of triethylene glycol was added, and the mixed solution was stirred for 20 minutes at 30° C., then cooled down to 20° C., and further stirred for 30 minutes. Thereafter, 37.89 g of 4-mercaptomethyl-1,8-dimercapto-3,6-dithiaoctane was added thereto to be mixed and dissolved therein.

After degasifying the homogenous solution at 600 Pa for 1 hour, the resultant was filtered through a 1 µm PTFE made filter, and then charged into a mold assembled from a pair of glass molds and tape. The mold was placed in an oven and slowly heated from a temperature of 25° C. to 120° C. over 20 hours and the polymerization was carried out. After completing the polymerization, the mold was taken out from the oven, and mold-released to obtain a resin. The obtained resin was further subjected to annealing at 120° C. for 4 hours.

The resin thus obtained was colorless and had high transparency, thereby being preferable. The resin had a refractive index (ne) of 1.603, Abbe's number (ve) of 40, heat resistance at 103° C., maximum point in tensile stress test of 95 (N/mm$^2$), tintability of 23% transmission ratio, and impact resistance of 1,000 g or greater in 50% nondestructive weight. The evaluation results are shown in Table 2.

Example 3

To 54.22 g of 2,5(6)-bis(isocyanatomethyl)-bicyclo[2.2.1]heptane, 0.10 g of dibutyltin chloride as the curing catalyst, 0.25 g of internal mold release agent (product name: Zelec UN), and 0.05 g of UV absorbing agent (product name: Viosorb 583) were mixed and dissolved at 20° C., to give a homogeneous solution. To this homogeneous solution, 7.89 g of triethylene glycol and 37.89 g of 4-mercaptomethyl-1,8-dimercapto-3,6-dithiaoctane were added at once, and these were mixed and dissolved in a water bath at 20° C. over 30 minutes to give a homogeneous solution.

After degasifying the homogenous solution at 600 Pa for 1 hour, the resultant was filtered through a 1 µm PTFE made filter, and then charged into a mold assembled from a pair of glass molds and tape. The mold was placed in an oven and slowly heated from a temperature of 25° C. to 120° C. over 20 hours and the polymerization was carried out. After completing the polymerization, the mold was taken out from the oven, and mold-released to obtain a resin. The obtained resin was further subjected to annealing at 120° C. for 4 hours.

The resin thus obtained was colorless and had high transparency, thereby being preferable, and it was confirmed to have the same properties as the resin obtained in Example 2. The evaluation results are shown in Table 2.

Example 4

To 56.63 g of 2,5(6)-bis(isocyanatomethyl)-bicyclo[2.2.1]heptane, 0.10 g of dibutyltin chloride as the curing catalyst, 0.25 g of internal mold release agent (product name: Zelec UN), and 0.05 g of UV absorbing agent (product name: Viosorb 583) were mixed and dissolved at 20° C., to give a homogeneous solution. To this homogeneous solution, 8.74 g of diethylene glycol was added, and the mixed solution was stirred for 20 minutes at 30° C., then cooled down to 20° C., and further stirred for 30 minutes. Thereafter, 34.63 g of 4-mercaptomethyl-1,8-dimercapto-3,6-dithiaoctane was added thereto to be mixed and dissolved therein.

After degasifying the homogenous solution at 600 Pa for 1 hour, the resultant was filtered through a 1 µm PTFE made filter, and then charged into a mold assembled from a pair of glass molds and tape. The mold was placed in an oven and slowly heated from a temperature of 25° C. to 120° C. over 20 hours and the polymerization was carried out. After completing the polymerization, the mold was taken out from the oven, and mold-released to obtain a resin. The obtained resin was further subjected to annealing at 120° C. for 4 hours.

The resin thus obtained was colorless and had high transparency, thereby being preferable. The resin had a refractive index (ne) of 1.597, Abbe's number (ve) of 41, heat resistance at 104° C., maximum point in tensile stress test of 96 (N/mm$^2$), tintability of 21% transmission ratio, and impact resistance of 1,000 g or greater in 50% nondestructive weight. The evaluation results are shown in Table 2.

Example 5

To 56.63 g of 2,5(6)-bis(isocyanatomethyl)-bicyclo[2.2.1]heptane, 0.10 g of dibutyltin chloride as the curing catalyst, 0.25 g of internal mold release agent (product name: Zelec UN), and 0.05 g of UV absorbing agent (product name: Viosorb 583) were mixed and dissolved at 20° C., to give a homogeneous solution. To this homogeneous solution, 8.74 g of diethylene glycol and 34.63 g of 4-mercaptomethyl-1,8-dimercapto-3,6-dithiaoctane were added at once, and these were mixed and dissolved in a water bath at 20° C. over 30 minutes to give a homogeneous solution.

After degasifying the homogenous solution at 600 Pa for 1 hour, the resultant was filtered through a 1 µm PTFE made filter, and then charged into a mold assembled from a pair of glass molds and tape. The mold was placed in an oven and slowly heated from a temperature of 25° C. to 120° C. over 20 hours and the polymerization was carried out. After completing the polymerization, the mold was taken out from the oven, and mold-released to obtain a resin. The obtained resin was further subjected to annealing at 120° C. for 4 hours.

The resin thus obtained was colorless and had high transparency, thereby being preferable, and it was confirmed to have the same properties as the resin obtained in Example 4. The evaluation results are shown in Table 2.

Example 6

To 57.68 g of 2,5(6)-bis(isocyanatomethyl)-bicyclo[2.2.1] heptane, 0.05 g of dibutyltin chloride as the curing catalyst, 0.25 g of internal mold release agent (product name: Zelec UN), and 0.05 g of UV absorbing agent (product name: Viosorb 583) were mixed and dissolved at 20° C., to give a homogeneous solution. To this homogeneous solution, 4.45 g of diethylene glycol was added, and the mixed solution was stirred for 60 minutes at 20° C. Then, 2.60 g of ethylene glycol was further added thereto, and the mixed solution was stirred for 60 minutes at 20° C. Thereafter, 34.63 g of 4-mercaptomethyl-1,8-dimercapto-3,6-dithiaoctane was added thereto to be mixed and dissolved therein.

After degasifying the homogenous solution at 600 Pa for 1 hour, the resultant was filtered through a 1 μm PTFE made filter, and then charged into a mold assembled from a pair of glass molds and tape. The mold was placed in an oven and slowly heated from a temperature of 25° C. to 120° C. over 20 hours and the polymerization was carried out. After completing the polymerization, the mold was taken out from the oven, and mold-released to obtain a resin. The obtained resin was further subjected to annealing at 120° C. for 4 hours.

The resin thus obtained was colorless and had high transparency, thereby being preferable. The resin had a refractive index (ne) of 1.598, Abbe's number (ve) of 41, heat resistance at 109° C., maximum point in tensile stress test of 101 (N/mm$^2$), tintability of 25% transmission ratio, and impact resistance of 1,000 g or greater in 50% nondestructive weight. The evaluation results are shown in Table 2.

Comparative Example 1

To 45.71 g of isophorone diisocyanate and 9.14 g of hexamethylene diisocyanate, 0.15 g of dibutyltin chloride as the curing catalyst, 0.20 g of internal mold release agent (product name: Zelec UN), and 0.05 g of UV absorbing agent (product name: Viosorb 583) were mixed and dissolved at 20° C., to give a homogeneous solution. To this homogeneous solution, 45.14 g of 4-mercaptomethyl-1,8-dimercapto-3,6-dithiaoctane was added to be mixed and dissolved therein.

After degasifying the homogenous solution at 600 Pa for 1 hour, the resultant was filtered through a 1 μm PTFE made filter, and then charged into a mold assembled from a pair of glass molds and tape. The mold was placed in an oven and slowly heated from a temperature of 25° C. to 120° C. over 20 hours and the polymerization was carried out. After completing the polymerization, the mold was taken out from the oven, and mold-released to obtain a resin. The obtained resin was further subjected to annealing at 120° C. for 4 hours.

The resin thus obtained had a refractive index (ne) of 1,601, Abbe's number (ve) of 39, heat resistance at 119° C., maximum point in tensile stress test of 83 (N/mm$^2$), tintability of 48% transmission ratio, and impact resistance of 33 g in 50% nondestructive weight. The evaluation results are shown in Table 2.

Comparative Example 2

To 50.57 g of 2,5(6)-bis(isocyanatomethyl)-bicyclo[2.2.1] heptane, 0.06 g of dibutyltin chloride as the curing catalyst, 0.12 g of internal mold release agent (product name: Zelec UN), and 0.05 g of UV absorbing agent (product name: Viosorb 583) were mixed and dissolved at 20° C., to give a homogeneous solution. To this homogeneous solution, 23.86 g of pentaerythritoltetrakis(3-mercaptopropionate) and 25.57 g of 4-mercaptomethyl-1,8-dimercapto-3,6-dithiaoctane were added to be mixed and dissolved therein.

After degasifying the homogenous solution at 600 Pa for 1 hour, the resultant was filtered through a 1 μm PTFE made filter, and then charged into a mold assembled from a pair of glass molds and tape. The mold was placed in an oven and slowly heated from a temperature of 25° C. to 120° C. over 20 hours and the polymerization was carried out. After completing the polymerization, the mold was taken out from the oven, and mold-released to obtain a resin. The obtained resin was further subjected to annealing at 120° C. for 4 hours.

The resin thus obtained had a refractive index (ne) of 1.598, Abbe's number (ve) of 41, heat resistance at 117° C., maximum point in tensile stress test of 88 (N/mm$^2$), tintability of 56% transmission ratio, and impact resistance of 542 g in 50% nondestructive weight. The evaluation results are shown in Table 2.

Comparative Example 3

To 62.2 g of 2,5(6)-bis(isocyanatomethyl)-bicyclo[2.2.1] heptane, 0.10 g of dibutyltin chloride as the curing catalyst, 0.30 g of internal mold release agent (product name: Zelec UN), and 0.05 g of UV absorbing agent (product name: Viosorb 583) were mixed and dissolved at 20° C., to give a homogeneous solution. To this homogeneous solution, 11.9 g of 2-mercaptoethanol and 25.9 g of 4-mercaptomethyl-1,8-dimercapto-3,6-dithiaoctane were added to be mixed and dissolved therein.

After degasifying the homogenous solution at 600 Pa for 1 hour, the resultant was filtered through a 1 μm PTFE made filter, and then charged into a mold assembled from a pair of glass molds and tape. The mold was placed in an oven and slowly heated from a temperature of 25° C. to 120° C. over 20 hours and the polymerization was carried out. After completing the polymerization, the mold was taken out from the oven, and mold-released to obtain a resin. The obtained resin was further subjected to annealing at 120° C. for 4 hours.

The resin thus obtained was colorless and had high transparency, thereby being preferable. The resin had a refractive index (ne) of 1.596, Abbe's number (ve) of 41, heat resistance at 118° C., maximum point in tensile stress test of 88 (N/mm$^2$), tintability of 42% transmission ratio, and impact resistance of 114 g in 50% nondestructive weight. The evaluation results are shown in Table 2.

[Table 1]

TABLE 1

| | Isocyanate Compound | | Thiol Compound | | Active Hydrogen Compound | | H | I % |
|---|---|---|---|---|---|---|---|---|
| | type | mole | type | mole | type | mole | | |
| Example 1 | (A)-1 | 0.28 | (B)-1 | 0.13 | (C)-1 | 0.083 | 0.98 | 30 |
| Example 2 | (A)-1 | 0.26 | (B)-1 | 0.15 | (C)-2 | 0.053 | 0.93 | 20 |
| Example 3 | (A)-1 | 0.26 | (B)-1 | 0.15 | (C)-2 | 0.053 | 0.93 | 20 |
| Example 4 | (A)-1 | 0.27 | (B)-1 | 0.13 | (C)-3 | 0.082 | 0.98 | 29 |
| Example 5 | (A)-1 | 0.27 | (B)-1 | 0.13 | (C)-3 | 0.082 | 0.98 | 29 |
| Example 6 | (A)-1 | 0.28 | (B)-1 | 0.13 | (C)-3 | 0.042 | 1.00 | 30 |
| | | | | | (F)-1 | 0.042 | | |
| Comparative Example 1 | (D)-1 | 0.21 | (B)-1 | 0.17 | | | 1.04 | 0 |
| | (D)-2 | 0.054 | | | | | | |
| Comparative Example 2 | (A)-1 | 0.25 | (B)-1 | 0.098 | | | 1.02 | 0 |
| | | | (B)-2 | 0.049 | | | | |
| Comparative Example 3 | (A)-1 | 0.30 | (B)-1 | 0.099 | | | 1.01 | 0 |
| | | | (E)-1 | 0.15 | | | | |

In Examples 1 to 6 and Comparative Example 2, a mixture of 2,5-bis(isocyanatomethyl)-bicyclo[2,2,1]heptane and 2,6-bis(isocyanatomethyl)-bicyclo[2,2,1]heptane was used as 2,5(6)-bis(isocyanatomethyl)-bicyclo[2,2,1]heptane.

The symbols in Table 1 are indicated as follows.
(A)-1: 2,5(6)-bis(isocyanatomethyl)bicycle[2,2,1]heptane
(B)-1: 4-mercaptomethyl-1,8-dimercapto-3,6-dithiaoctane
(B)-2: pentaerythritoltetrakis(3-mercaptopropionate)
(C)-1: 1,4-butandiol
(C)-2: triethylene glycol
(C)-3: diethylene glycol
(D)-1: isophorone diisocyanate
(D)-2: hexamethylene diisocyanate
(E)-1: 2-mercaptoethanol
(F)-1: ethylene glycol
H: a molar ratio of functional groups represented by NCO/(SH+OH), for the used ratio of the isocyanate, the thiol compound and the active hydrogen compound
I: a ratio (%) of number of moles of hydroxy group to the total number of moles of thiol group and hydroxy group: 100×p/(p+q+r), provided that the number of moles of the hydroxy group and the thiol group in (C) compound represented by Formula (3) are p and q, respectively, and the number of moles of the thiol group in the thiol compound is r.

[Table 2]

TABLE 2

| | Refractive Index (ne) | Abbe's number (ve) | Heat Resistance (° C.) | Resin Strength (N/mm²) | Tintability (565 nm/ % T) | Impact Resistance (50% nondestructive weight) |
|---|---|---|---|---|---|---|
| Example 1 | 1.597 | 41 | 109 | 95 | ○ | ○ |
| Example 2 | 1.603 | 40 | 103 | 95 | ○ | ○ |
| Example 3 | 1.603 | 40 | 103 | 95 | ○ | ○ |
| Example 4 | 1.597 | 41 | 104 | 96 | ○ | ○ |
| Example 5 | 1.597 | 41 | 104 | 96 | ○ | ○ |
| Example 6 | 1.598 | 41 | 109 | 101 | ○ | ○ |
| Comparative Example 1 | 1.601 | 39 | 119 | 83 | Δ | X |
| Comparative Example 2 | 1.598 | 41 | 117 | 88 | Δ | Δ |
| Comparative Example 3 | 1.596 | 41 | 118 | 88 | Δ | X |

From the above results, it is clear that the resins of Examples are excellent in tintability and impact resistance and well-balanced in heat resistance and resin strength, as compared to those of Comparative Examples.

Further, in accordance with above Examples, transparent resins having excellent optical balances such as high refractive index and high Abbe's number, sufficient heat resistance and resin strength at low density, which are particularly excellent in impact resistance and tintability, can be obtained. The obtained resins are materials ideal for use as an optical material in the field of high refractive index, especially in the field of spectacles lenses.

The invention claimed is:

1. A polymerizable composition comprising,
(A) an alicyclic isocyanate compound represented by following Formula (1) and/or by following Formula (2):

(1)

(2)

(B) at least one polythiol compound optionally having at least one (poly)sulfide bond in a molecule selected from the group consisting of 4-mercaptomethyl-1,8-dimercapto-3,6-dithiaoctane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, and
(C) at least one compound represented by following Formula (3):

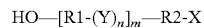
(3)

(in above Formula (3), X is an OH group or a SH group; Y is an oxygen atom; R1 and R2 are each independently an optionally substituted methylene group or an optionally substituted alkylene group having carbon atoms of not smaller than 2 and not larger than 4; n is an integer of 1; and m is an integer of not smaller than 1 and not larger than 3, provided that (carbon number of R1+n)×m+(carbon number of R2) is 3 or larger), wherein the used ratio of said (A) the alicyclic isocyanate compound represented by Formula (1) and/or by Formula (2), said (B) the polythiol compound optionally having at least one (poly)sulfide bond in a molecule, and said (C) the compound represented by Formula (3), is such that the molar ratio of functional groups represented by NCO/(SH+OH) is not less than 0.5 and not more than 3.0, and when given that the number of moles of the hydroxy group and thiol group in said (C) the compound represented by Formula (3) are p and q, respectively, and the number of moles of a thiol group in said (B) the polythiol compound optionally having at least one (poly)sulfide bond in a molecule is r, p/(p+q+r) is not less than 0.001 and not more than 0.40.

2. The polymerizable composition as claimed in claim 1, wherein in said Formula (3) representing said component (C), R1 and R2 are each independently an optionally substituted alkylene group having 2 or 3 carbon atoms.

3. The polymerizable composition as claimed in claim 2, wherein said component (C) is triethylene glycol or diethylene glycol.

4. The polymerizable composition as claimed in claim 3, wherein said (A) the alicyclic isocyanate compound represented by Formula (1) and/or by Formula (2) is at least one of 2,5-bis(isocyanatomethyl)-bicyclo[2.2.1]heptane and 2,6-bis(isocyanatomethyl)-bicyclo[2.2.1]heptane, and
said (B) the polythiol compound optionally having at least one (poly)sulfide bond in a molecule is at least one compound selected from the group consisting of 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane.

5. A process for producing a resin by polymerizing the polymerizable composition as claimed in claim 1.

6. A resin obtained by reacting:
(A) an alicyclic isocyanate compound represented by following Formula (1) and/or by following Formula (2):

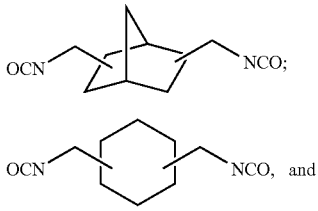

(B) at least one polythiol compound optionally having at least one (poly)sulfide bond in a molecule selected from the group consisting of 4-mercaptomethyl-1,8-dimercapto-3,6-dithiaoctane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, with
(C) at least one compound represented by following Formula (3):

$$HO-[R1-(Y)_n]_m-R2-X \quad (3)$$

(in above Formula (3), X is an OH group or a SH group; Y is an oxygen atom; R1 and R2 are each independently an optionally substituted methylene group or an optionally substituted alkylene group having carbon atoms of not smaller than 2 and not larger than 4; n is an integer of 1; and m is an integer of not smaller than 1 and not larger than 3, provided that (carbon number of R1+n)×m+ (carbon number of R2) is 3 or larger)), wherein the used ratio of said (A) the alicyclic isocyanate compound represented by Formula (1) and/or by Formula (2), said (B) the polythiol compound optionally having at least one (poly)sulfide bond in a molecule, and said (C) the compound represented by Formula (3), is such that the molar ratio of functional groups represented by NCO/(SH+OH) is not less than 0.5 and not more than 3.0, and when given that the number of moles of the hydroxy group and thiol group in said (C) the compound represented by Formula (3) are p and q, respectively, and the number of moles of a thiol group in said (B) the polythiol compound optionally having at least one (poly)sulfide bond in a molecule is r, p/(p+q+r) is not less than 0.001 and not more than 0.40.

7. An optical component comprising the resin as claimed in claim 6.

8. A lens comprising the optical component as claimed in claim 7.

9. A spectacles lens comprising the lens as claimed in claim 8.

10. A polymerizable composition comprising,
(A) an alicyclic isocyanate compound represented by following Formula (1) and/or by following Formula (2):

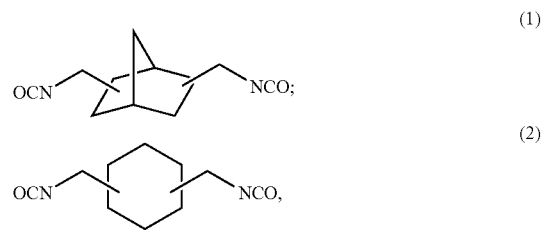

(B) at least one polythiol compound optionally having at least one (poly)sulfide bond in a molecule selected from the group consisting of 4-mercaptomethyl-1,8-dimercapto-3,6-dithiaoctane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, and
(C) 1,4-butanediol,
wherein the used ratio of said (A) the alicyclic isocyanate compound represented by Formula (1) and/or by Formula (2), said (B) the polythiol compound optionally having at least one (poly)sulfide bond in a molecule, and said (C) 1,4-butanediol, is such that the molar ratio of functional groups represented by NCO/(SH+OH) is not less than 0.5 and not more than 3.0, and when given that the number of moles of the hydroxy group in said (C) 1,4-butanediol is p, and the number of moles of a thiol group in said (B) the polythiol compound optionally having at least one (poly)sulfide bond in a molecule is r, p/(p+r) is not less than 0.001 and not more than 0.40.

* * * * *